Inventor
Emil Penkala
by
Pierce, Scheffler & Parker
his Atty's

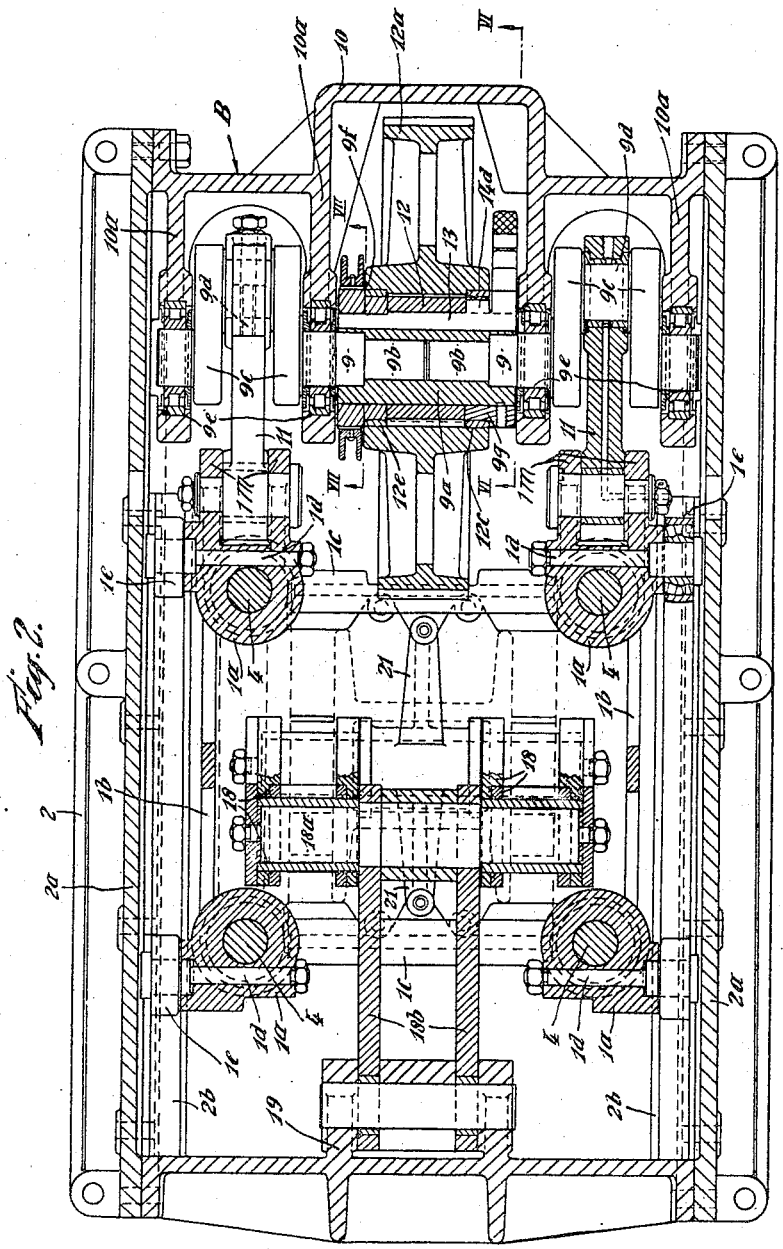

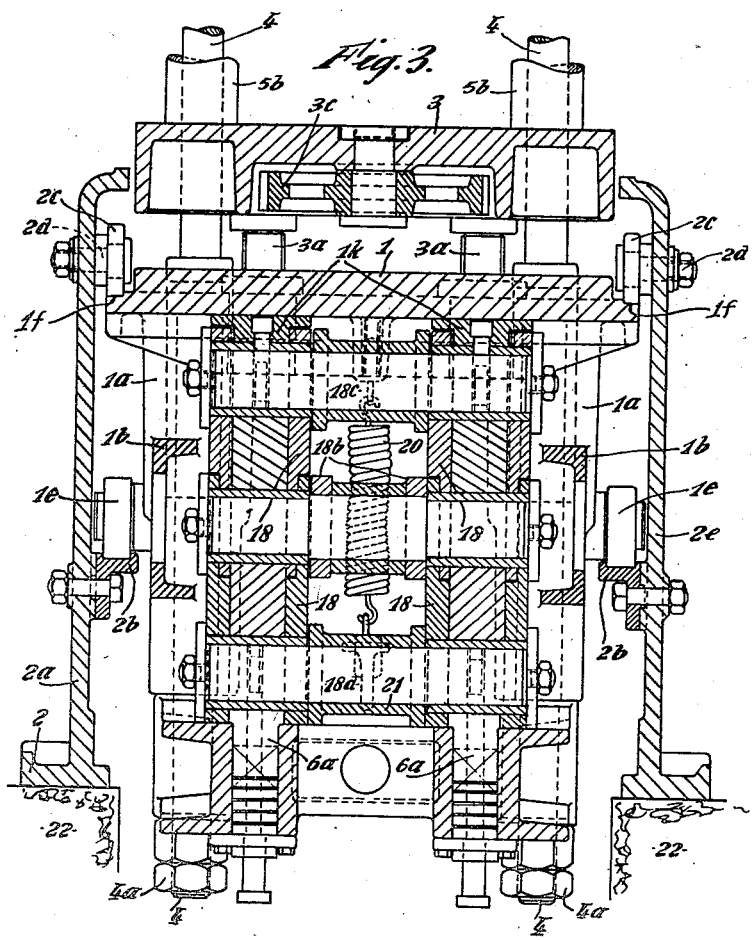
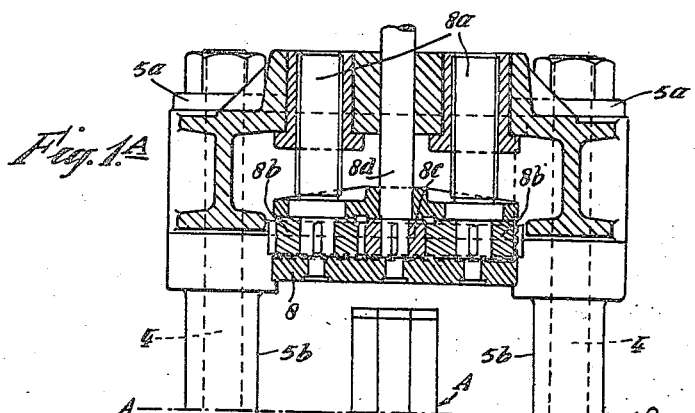

July 31, 1951 E. PENKALA 2,562,475
APPARATUS FOR CUTTING, PUNCHING, OR PRESSING
MOVING CONTINUOUS LENGTH MATERIAL
Filed Aug. 12, 1948 13 Sheets-Sheet 4

Inventor
Emil Penkala
by
Pierce, Scheffler & Parker
his attys

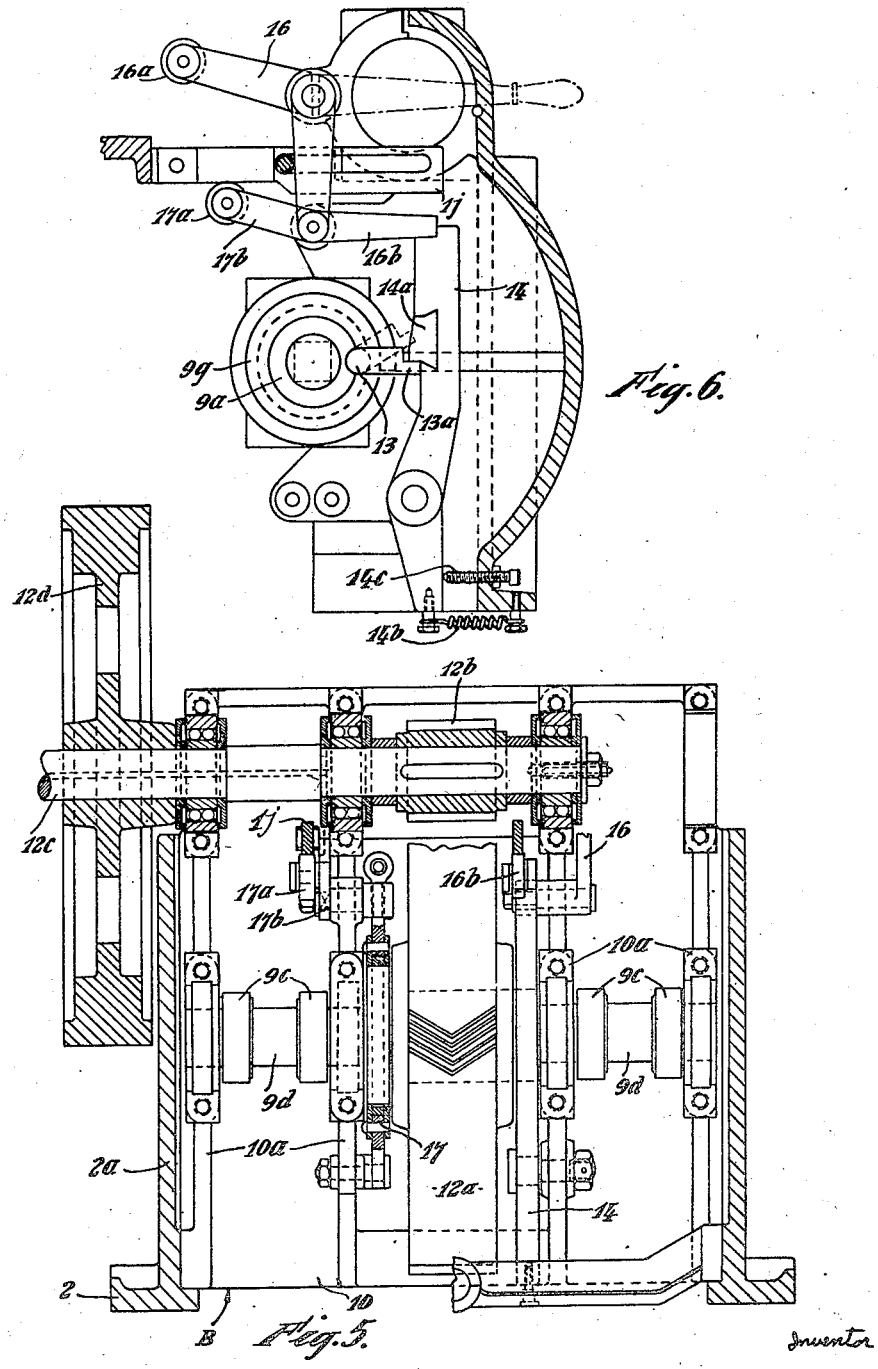

July 31, 1951
E. PENKALA
2,562,475
APPARATUS FOR CUTTING, PUNCHING, OR PRESSING MOVING CONTINUOUS LENGTH MATERIAL
Filed Aug. 12, 1948
13 Sheets-Sheet 6
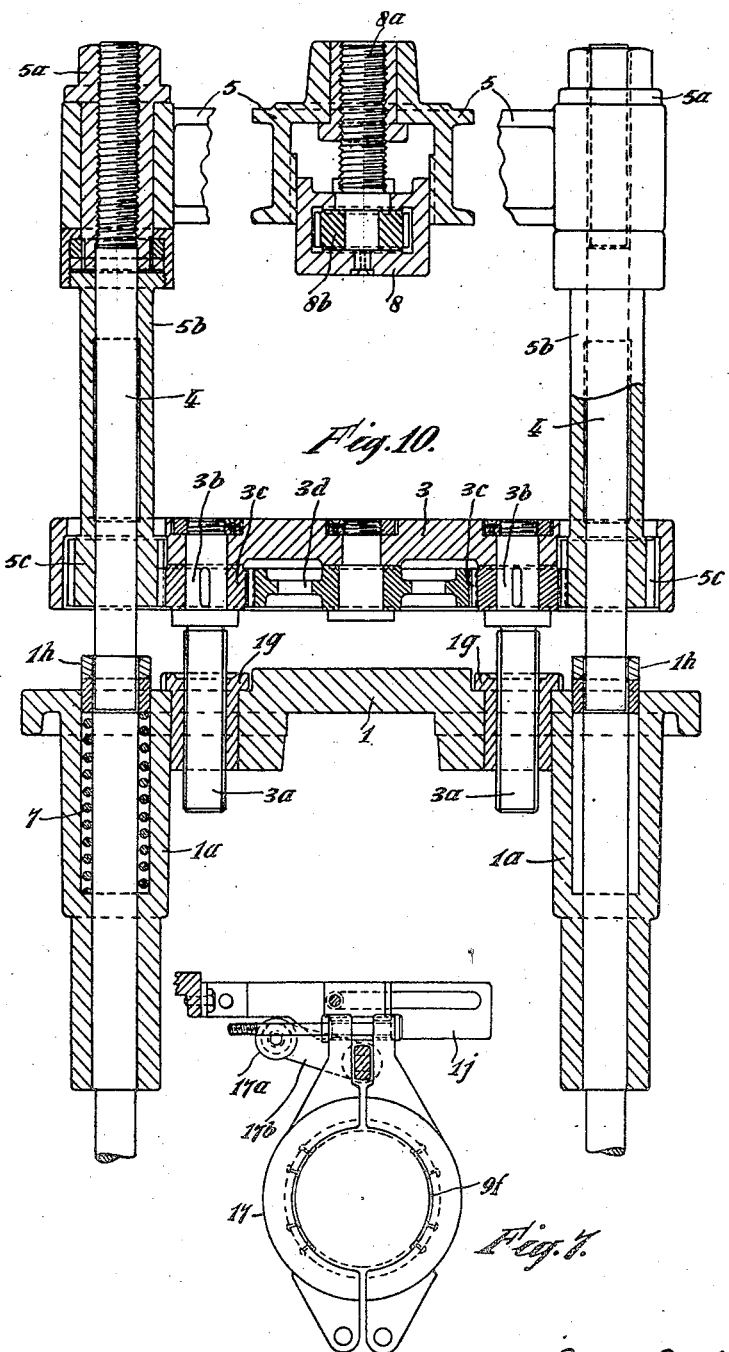
Inventor
Emil Penkala
by
Pierce, Scheffler & Parker
his attys

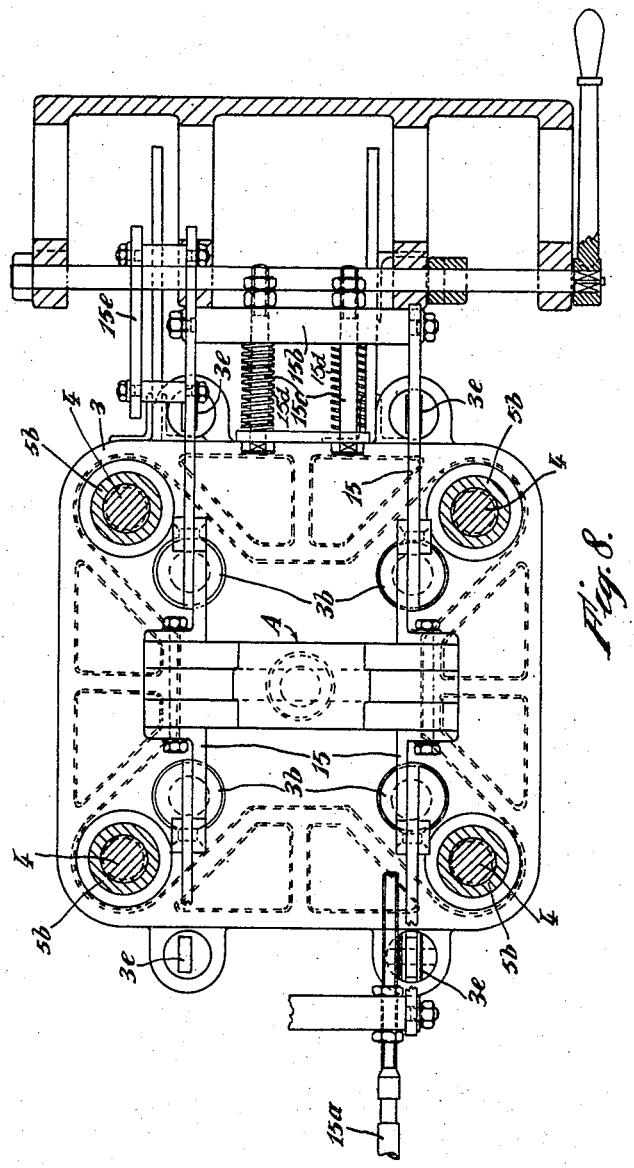

July 31, 1951 E. PENKALA 2,562,475
APPARATUS FOR CUTTING, PUNCHING, OR PRESSING
MOVING CONTINUOUS LENGTH MATERIAL
Filed Aug. 12, 1948 13 Sheets-Sheet 8

Inventor
Emil Penkala
by
Pierce, Scheffler & Parker
his atty's

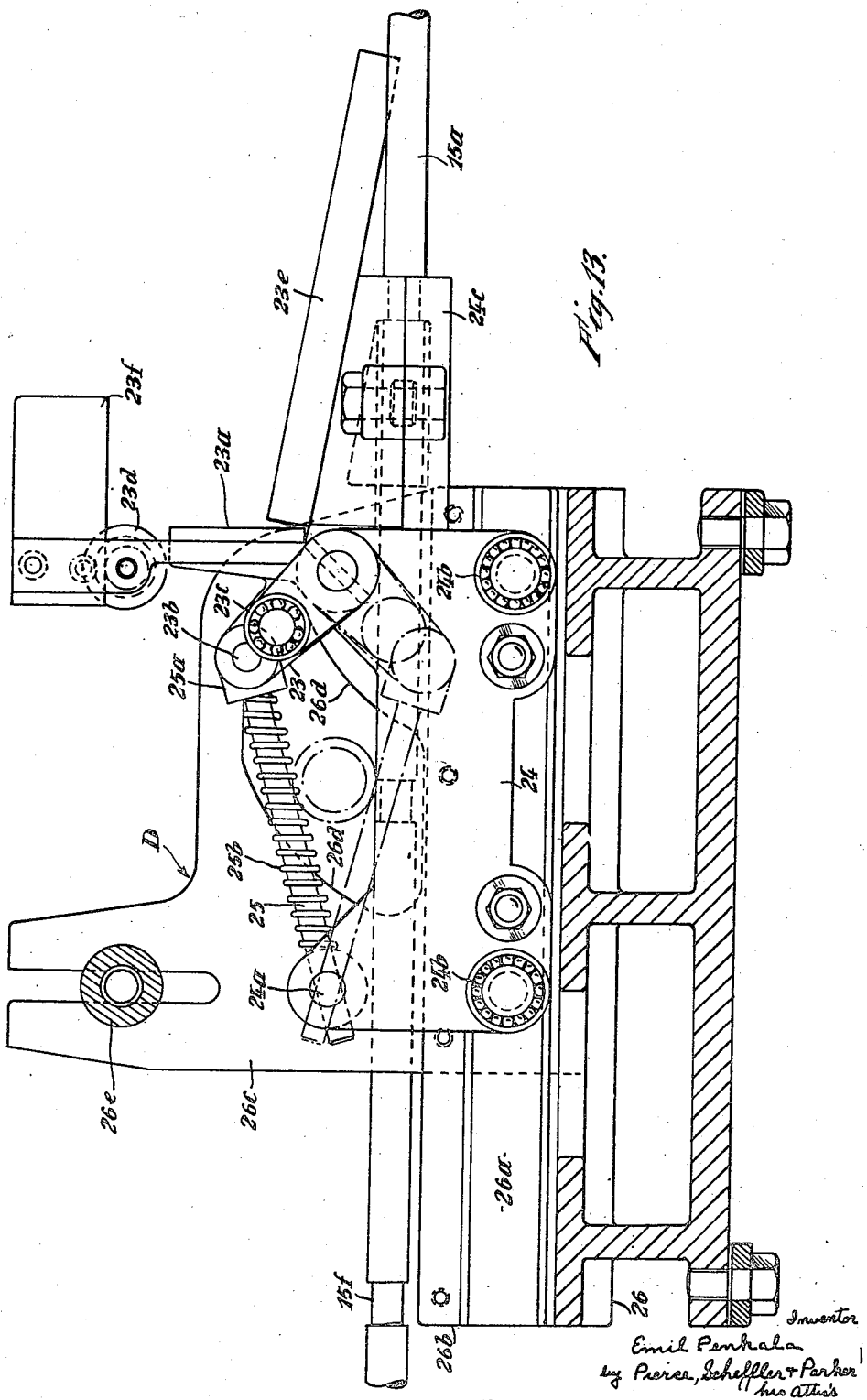

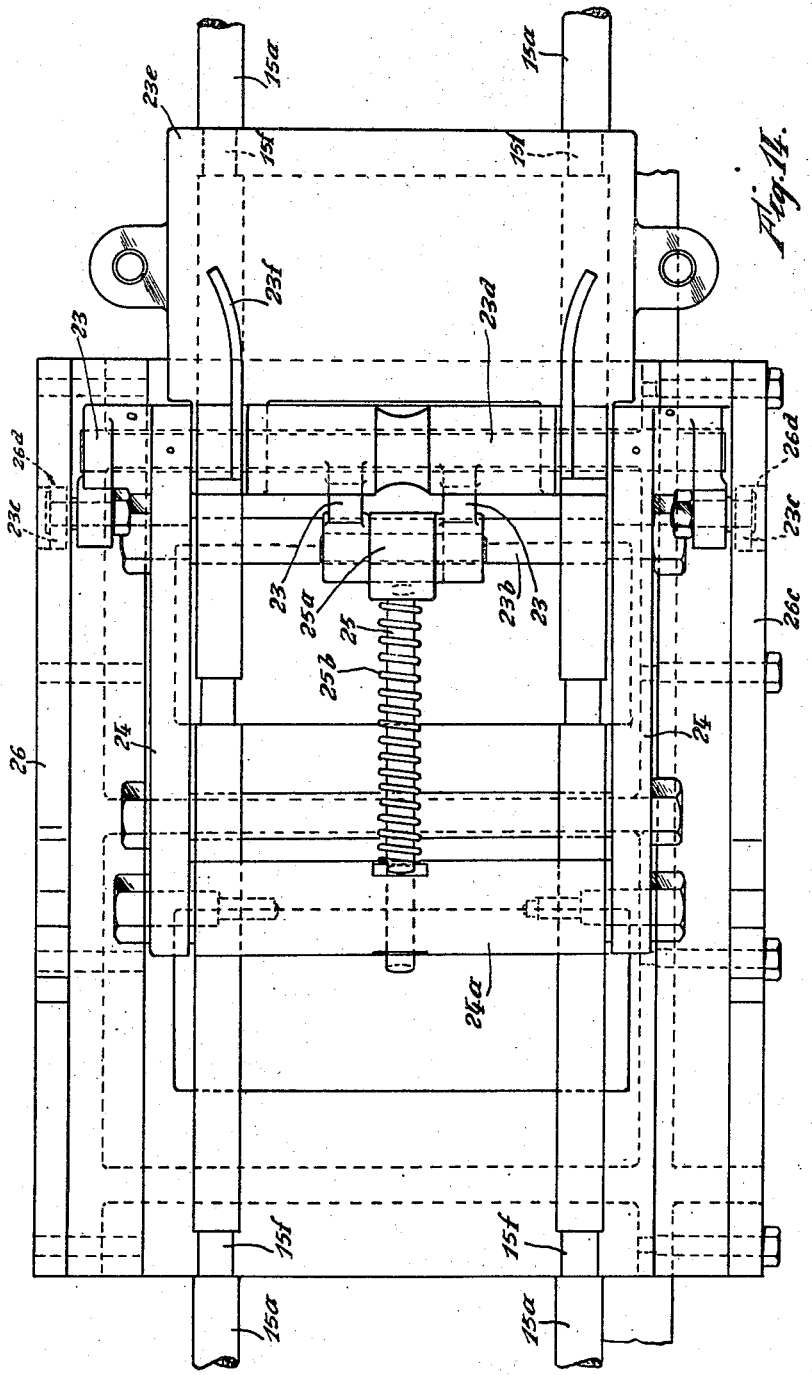

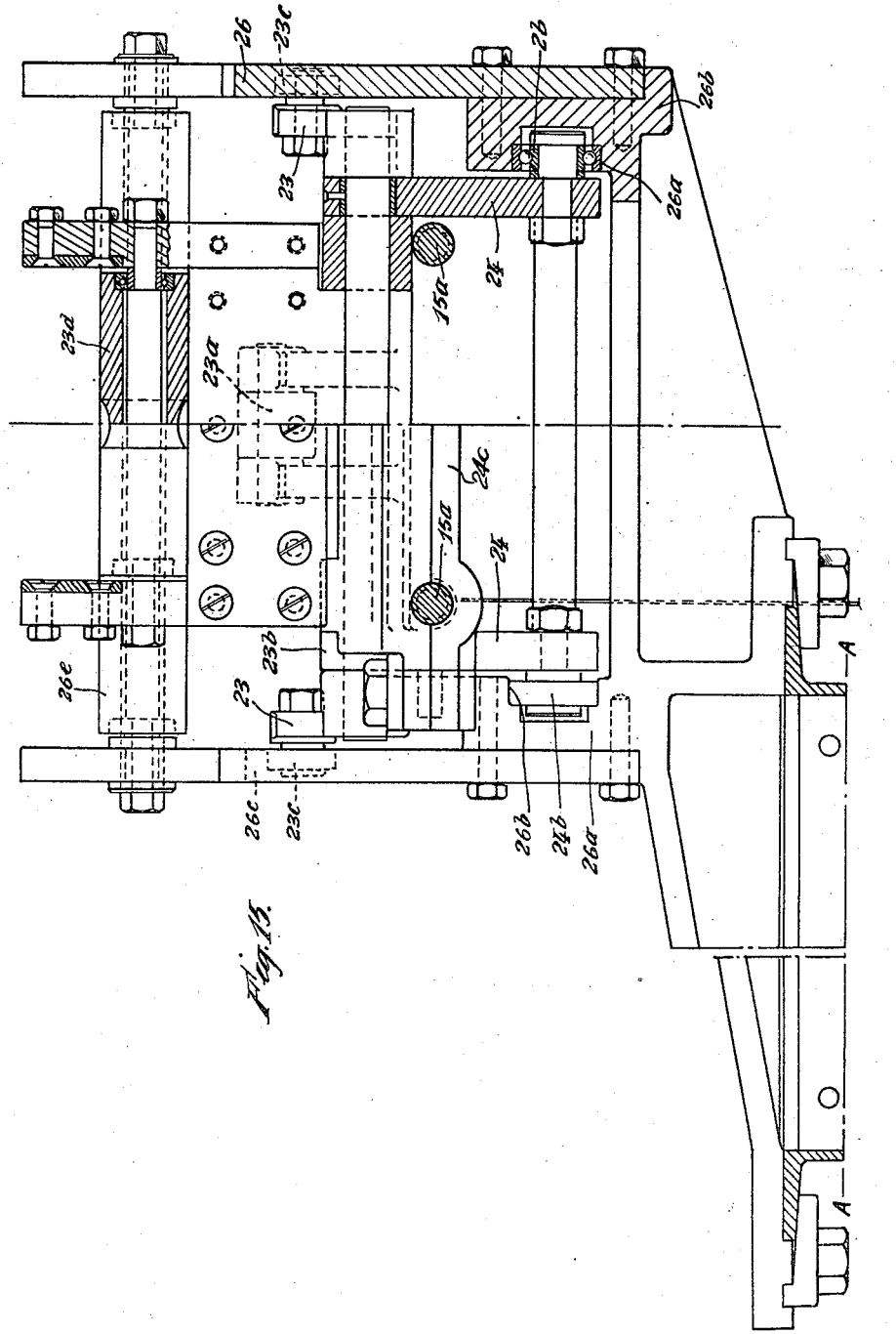

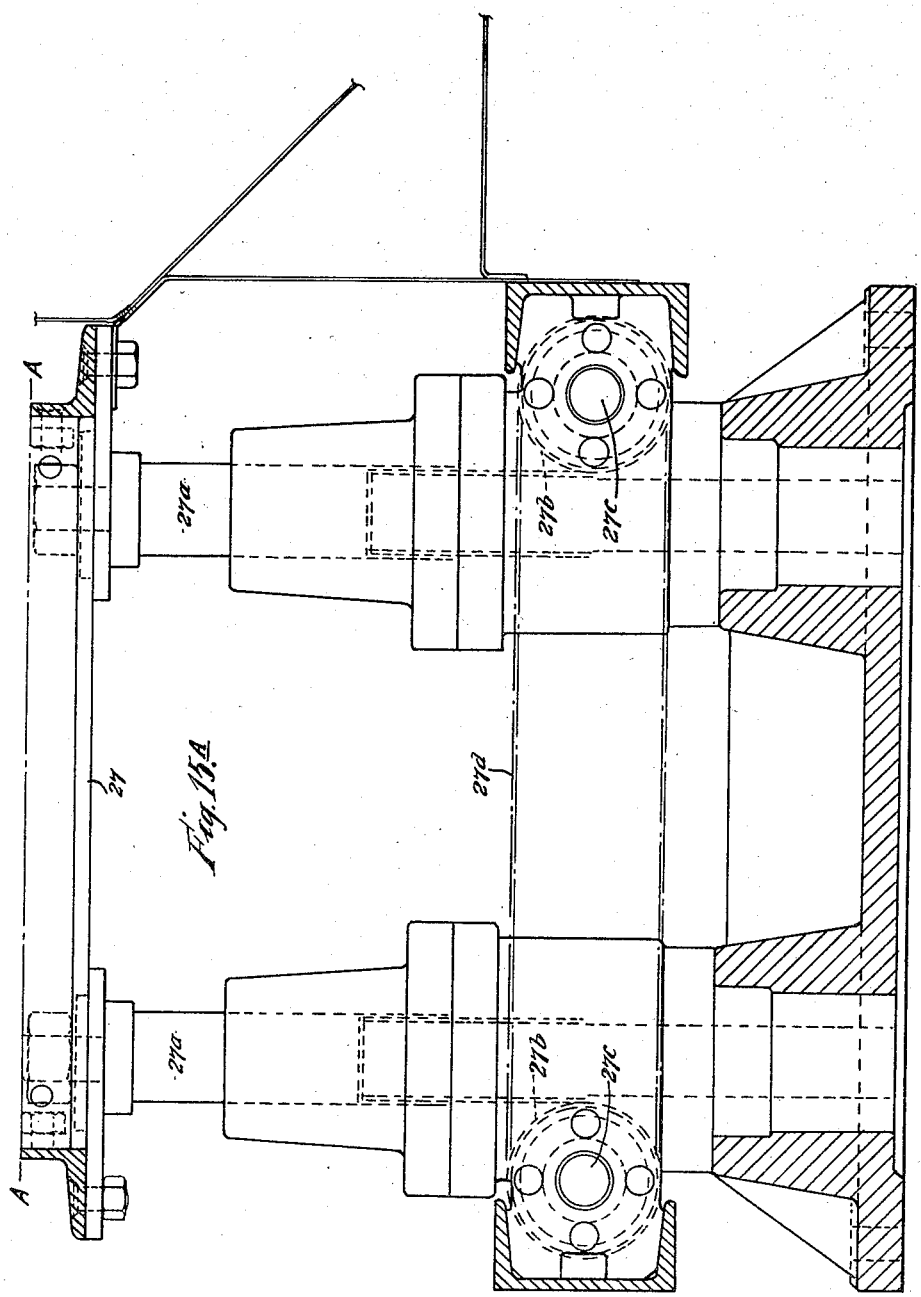

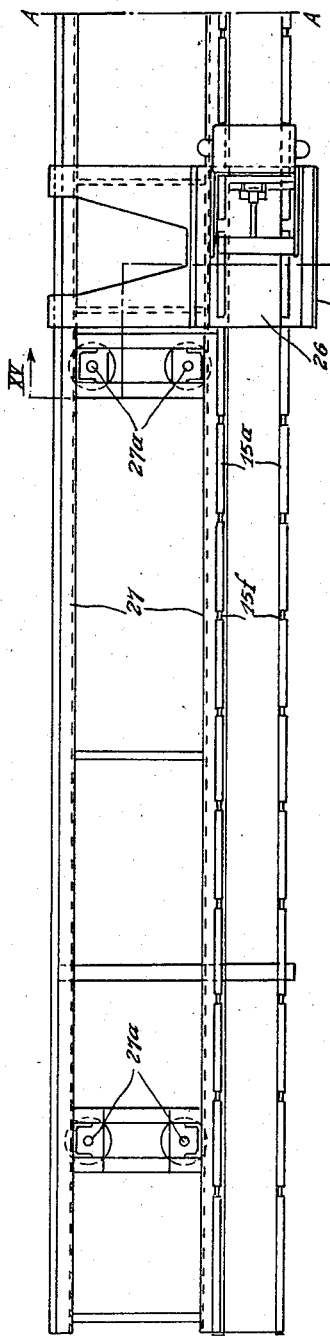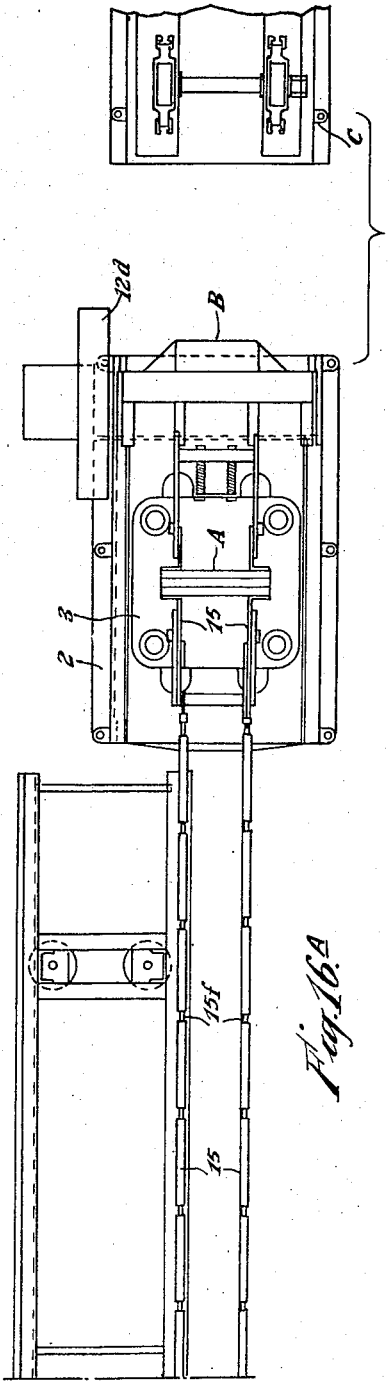

Patented July 31, 1951

2,562,475

UNITED STATES PATENT OFFICE 2,562,475

APPARATUS FOR CUTTING, PUNCHING, OR PRESSING MOVING CONTINUOUS LENGTH MATERIAL

Emil Penkala, Irvine, Scotland, assignor of one-half to Metal Trim Limited, Irvine, Scotland, a British company Application August 12, 1948, Serial No. 43,868
In Great Britain August 22, 1947

18 Claims. (Cl. 164—48)

This invention relates to apparatus for cutting, punching or pressing moving continuous length material, and is particularly concerned with improvements in apparatus for this purpose in which a die assemblage is reciprocable in the direction of movement of the continuous length material and in which, during the forward stroke of the die assemblage, initiated or controlled by a stop or other length-determining or spacing means actuated by the moving material, the dies are operated to effect a desired cutting, punching or pressing operation, whereafter the die assemblage returns to its initial position.

The present invention has for its object to provide improved apparatus, such as referred to above, wherein the effective operating period of the dies during the forward movement thereof is sufficiently extended to avoid the necessity of percussive operation of the dies, and particularly to provide improved apparatus wherein the operation of the dies is positively related to the travel of a carrier therefor so as to take place during a part of the forward travel of such carrier during which speed thereof is substantially synchronised with the speed of the continuous length material.

Although the apparatus according to the invention is especially applicable for cutting into definite lengths a profiled section formed from a continuous strip in a rolling mill, it can also be employed for punching the metal strip prior to rolling the profiled section, or for punching the section after its formation. Furthermore, the apparatus is also applicable for embossing or otherwise pressing a profiled section at spaced positions along the the length thereof and also may be used for shearing rod or other continuous length material, or for similar purposes.

According to the present invention, the improved apparatus comprises a carrier for a die assemblage, said carrier being intermittently reciprocable on a bed or the like in the direction of movement of the continuous length material under the control of stop, catch or equivalent length-determining or spacing means co-operating with the continuously moving material, die-operating means provided on the reciprocable carrier for operation in a plane intersecting the direction of movement of the material, and mechanism whereby, on the forward movement of the said carrier, a complete reciprocation of said die-operating means is effected, and whereby, on the return stroke of the carrier, the said mechanism is inoperative on the die-operating means.

The invention also furthermore includes apparatus for cutting, punching or pressing moving continuous length material, comprising a carrier for a die assemblage, said carrier being intermittently reciprocable on a bed or the like in the direction of movement of the continuous length material by power-operated means under the control of stop, catch or equivalent length-determining or spacing means co-operating with the continuously moving material, so that, during part of the forward movement of the said carrier, the speed thereof is, or may be, substantially synchronized with the speed of the continuous length material, toggle mechanism comprising links connected between said carrier and die-operating means, and operatively connected to a fixed abutment, the arrangement being such that, during the forward movement of the carrier, the toggle mechanism operates to effect a complete downward and upward reciprocation of the die-operating means, and means for automatically disconnecting the toggle mechanism from the die-operating means during return movement of the carrier whereby the toggle mechanism may return to its initial position without operating the dies. Any suitable means may be provided for clutching the toggle mechanism to the die-operating means during the forward stroke of the carrier and for declutching the same during the return stroke of the carrier. In a convenient construction the toggle linkage is connected at the upper end to the reciprocable carrier and at the lower end to a cross-head structure vertically slidable in relation to the carrier and connected by parallel rods to a die-operating head disposed above the carrier. In such an arrangement the toggle linkage at the lower end may be connected to an element or elements slidable in relation to the cross-head structure and adapted to be clutched thereto by means of toothed or other suitable elements, the movement of the clutch elements for engaging and disengaging from the slidable element or elements being effected by mechanism co-operating with buffer stops at the ends of the reciprocatory movement of the carrier.

The die assemblage may be displaceable to a limited extent in relation to the carrier in the direction of movement of the material, by connection to stop or equivalent means co-acting with the material for determining the position at which the dies operate, so that said position is independent of precise timing of the carrier movement. Means, such as a cam connected to the die assemblage, may be adapted to actuate clutch mechanism for effecting the intermittent reciprocation of the carrier. The relative displacement of the die assemblage in relation to the carrier may be controlled by springs serving to return the assemblage to the initial position after the operation of the dies whereby, on completion of the return stroke of the carrier, the drive clutch means may be disengaged.

The carrier preferably is supported and/or guided on rollers for slidable movement in or upon the bed or the like.

Advantageously, the apparatus is constructed in such manner that the carrier and its toggle mechanism may be readily removed as a unit from the bed on which it slides and so that the crank or other mechanism for effecting reciprocation of the carrier also may be removed as a unit. The die assemblage may be supported on the carrier by means of a table the height of which may be adjustable in relation to the carrier, and means also may be provided for adjusting the height of the die-operating head above the table. For this purpose the rods connecting the head with the cross-head structure co-operating with the toggle mechanism may engage screw-threaded means in the head adjustable in length by rotary movement, and said means may be geared together so as to operate in unison. Said means also may be geared to similar adjusting means associated with the table whereby the head and the table may be raised and lowered simultaneously. Similarly, a die-operating element mounted in the head may be adjustable in relation thereto by means of parallel adjusting spindles geared together for operation in unison.

According to a further feature of the invention, in its particular application for cutting off predetermined lengths from continuous length material, such as a profiled section delivered from a rolling mill, the stop, or equivalent length-determining means, comprises a stop element carried by a lever structure influenced by a spring and having a toggle action, said length-determining means being connected to and being reciprocable with the die assemblage, and means such as cam surfaces being provided whereby, on operation of the dies to cut the section, the stop is caused to move forwardly about a pivotal axis so as to disengage from the end of the profiled section, whereafter the toggle spring acts to complete movement of the stop into a substantially horizontal position in which the cut-off length can pass freely thereover. Said cam surfaces are adapted to effect return of the length-determining means to its initial position during the return movement of the die assemblage. The stop element is fitted with a roller spaced above the same so that in the return movement of the stop the roller engages beneath the cut length and by co-operation with a fixed or adjustable roller disposed above the section at the forward end of the stop assemblage, serves to tilt the section and thereby facilitate or effect its forward discharge without any manual manipulation.

The toggle spring furthermore is adapted to act as a safety release for the section in the event of any failure of the die-operating means. The connection of the length-determining or spacing means with the die assemblage may be effected by means of rods having circumferential recesses at definitely spaced positions thereon whereby the stop may be positioned for operation of the dies at any one of a number of predetermined lengths or spacings.

The invention is hereinafter described, by way of example, with reference to the accompanying diagrammatic drawings, in which:

Fig. 1A is a continuation of Fig. 1 on the line A—A thereof;

Fig. 2 is a sectional plan on the line II—II of Fig. 1;

Fig. 3 is a cross-section on the line III—III of Fig. 1;

Fig. 5 is a cross-section on the line V—V of Fig. 1;

Fig. 6 is a detail section on the line VI—VI of Fig. 2;

Fig. 7 is a detail section on the line VII—VII of Fig. 2;

Fig. 8 is a sectional plan view on the line VIII—VIII of Fig. 1;

Fig. 10 is a sectional elevation on the line X—X of Fig. 9, showing also the adjustable table and the die-operating head;

Fig. 13 is a sectional side elevation illustrating a preferred construction of stop or length-determining means;

Fig. 14 is a plan view corresponding to Fig. 13;

Fig. 15 is a part sectional end elevation corresponding to Fig. 13;

Fig. 15A is a continuation of Fig. 15 on the line A—A thereof;

Fig. 16 is a plan view showing the general arrangement of the apparatus; and

Fig. 16A is a continuation of Fig. 16 on the line A—A thereof.

Figure 1:
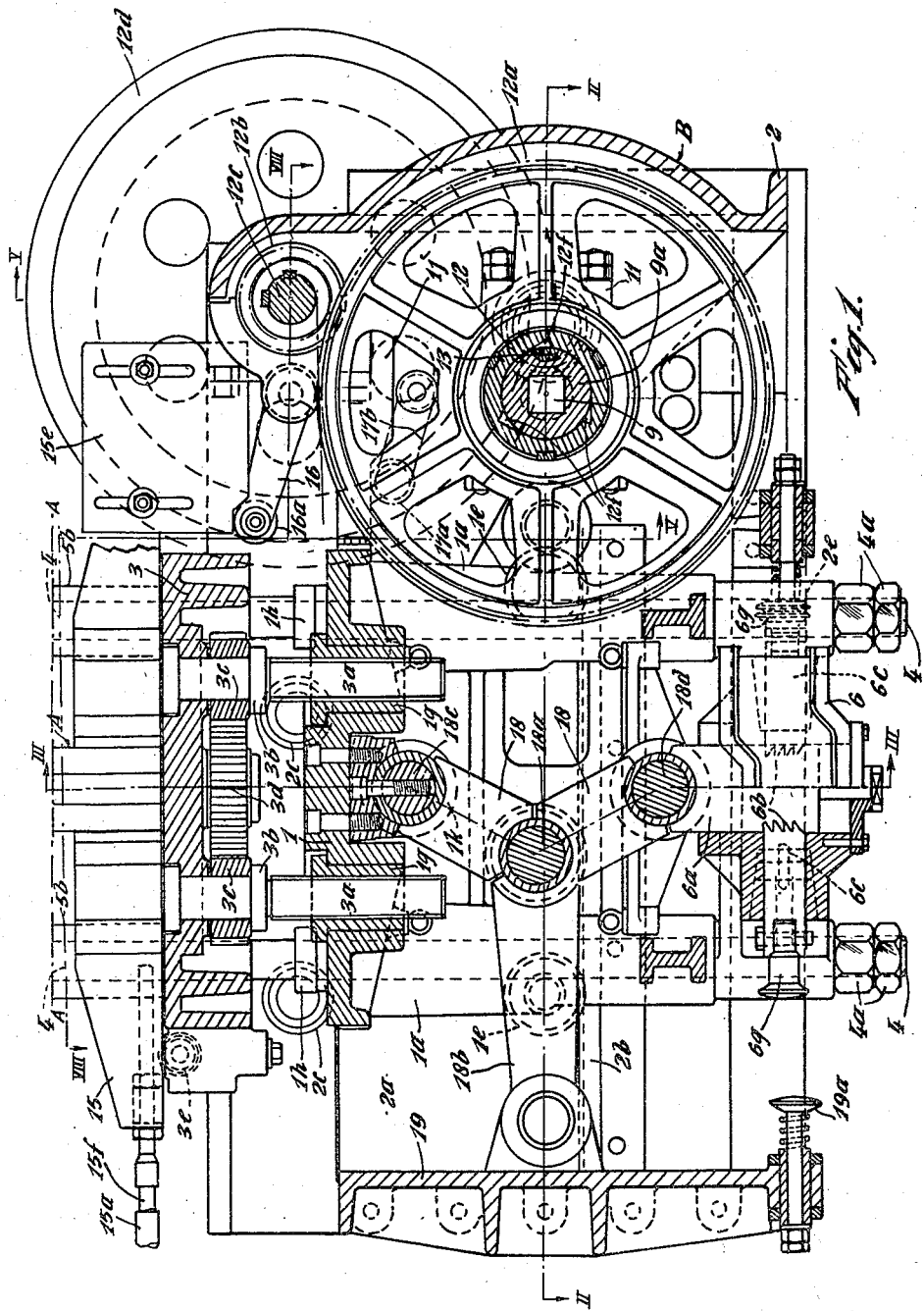
Fig. 1 is a sectional side elevation illustrating one embodiment of apparatus according to the invention applicable for cutting off definite lengths of profiled section formed in a continuous length from metal strip by passage through a rolling mill.
Figure 9:
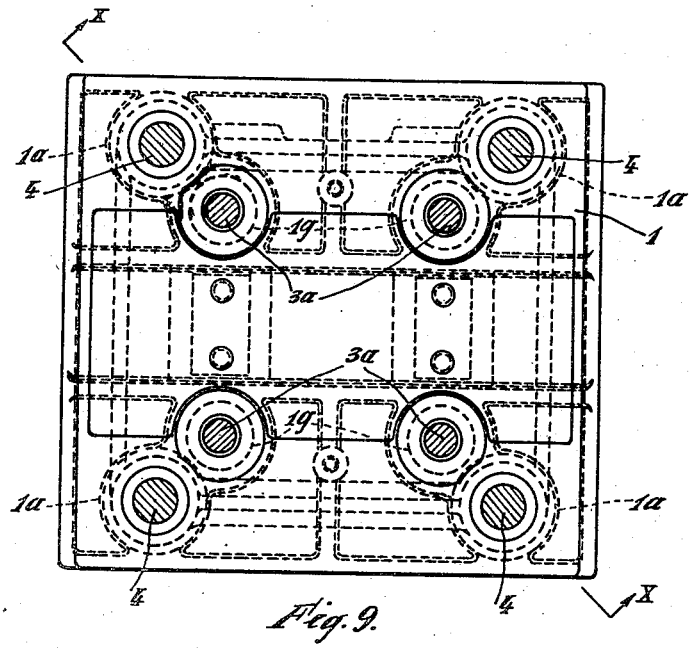
Fig. 9 is a plan view of the carrier for the die assemblage.

In carrying the invention into effect, and with reference to the accompanying diagrammatic drawings, a carrier for a cutting die assemblage A comprises a substantially rectangular horizontally disposed frame member 1 having at each corner a downwardly extending vertical leg 1a, the said legs 1a being connected by side frames 1b and by end cross members 1c to provide a rigid structure. Spindles 1d (Fig. 2) projecting laterally from the aforesaid legs 1a at an intermediate position in their height serve for the mounting of rollers 1e by which the frame structure is slidably mounted on longitudinally extending guides 2b fixed to or extending from side walls 2a of a fixed bed 2. Further rollers 2c mounted on spindles 2d projecting from the side walls 2a of the bed 2 are arranged to engage above longitudinally extending ledges 1f along the sides of the rectangular frame 1 so as to prevent any possibility of tilting of the slidable structure on the supporting rollers 1e.

Supported from the rectangular frame is a table 3 on which the die assemblage A is carried, and for the purpose of adjusting the height of this table it is advantageously supported from the frame 1 by means of four vertical screwed spindles 3a engaging correspondingly threaded bushes 1g in the rectangular frame 1, the said screwed spindles 3a having flanged upper parts 3b rotatably engaging and supporting the said table 3 and fitted with gears 3c which mesh with a centrally arranged gear 3d so that the four spindles 3a are constrained to rotate in unison to maintain the table 3 in a horizontal plane throughout its adjustment.

The vertical legs 1a of the slidable frame structure 1 are bored for the slidable reception of rods 4 which at their upper ends are screwed for engagement with adjusting sleeve members 5a rotatable in bores in a substantially rectangular head structure 5, and at their lower ends extend through bores in a cross-head structure 6 of corresponding rectangular formation, and at their extremities projecting below the cross-head structure are fitted with means such as nuts 4a whereby downward thrust exerted on the cross-head structure 6 may be transmitted through the rods 4 to the said head 5. For the purpose of normally maintaining the assemblage, consisting of the four rods 4, the head 5 and cross-head 6, in an upper position, compression springs 7 (Fig. 10) may be arranged around the rods 4, said springs 7 being accommodated in enlarged parts of the bores in the legs 1a of the slidable frame structure 1 so as to exert an upward pressure on nuts 1h or the like applied to the rods at a suitable position below the adjustable table 3.

For the purpose of effecting simultaneous adjustment of the height of the table 3 and of the head 5, the screwed sleeves 5a in the head 5 are adjustably connected to auxiliary sleeves 5b rotatable on the rods 4 and extending downwardly within clearance holes in the table 3, such auxiliary sleeves 5b having at their lower ends gears 5c adapted to engage the gears 3c on the screwed spindles 3a supporting the table 3. Thus, on rotating one of the screwed sleeves 5a in the head 5, all four sleeves 5a and 5b and also the four screwed spindles 3a supporting the table 3 are rotated simultaneously in order that the table 3 and head 5 may be maintained in a horizontal plane throughout the range of adjustment. The gears 5c on the lower ends of the auxiliary sleeves 5b are of greater depth than the gears 3c on the screwed spindles 3a supporting the table 3 so that the said gears 3c, 5c mesh with one another throughout the range of adjustment of the head 5 in relation to the table 3.

The head is provided with a transversely arranged pressure-applying element 8 projecting beneath the head and connected thereto by means of a pair of screwed spindles 8a which are provided with gears 8b meshing with a centrally arranged gear 8c on an adjusting spindle 8d projecting at the top of the head 5, whereby the effective height of the pressure-applying element 8 in relation to the head 5 may be readily adjusted.

For the purpose of effecting reciprocatory movement of the slidable frame structure 1, a crank shaft is mounted in a crank case unit B fixed detachably in one end of the bed 2 so that the crank shaft assembly may be readily removed for inspection or maintenance purposes. Preferably the crank shaft comprises two symmetrical half parts 9 connected at the middle by means of a bushing 9a having a square section bore fitting on correspondingly squared projecting parts 9b of the crank shaft halves. Each crank comprises spaced webs 9c connected by a crank pin 9d and journalled at each side in roller or equivalent bearings 9e in parallel disposed wall parts 10a of the crank case structure 10, and connecting rods 11 at one end engage the crank pins 9d, and at the other end are pivoted between projecting lugs 1h on the slidable frame structure 1. Mounted on the aforesaid bushing 9a connecting the crank shaft halves 9 is a rotatable sleeve 12 to which is keyed a large gear wheel 12a which is constantly driven by means of a pinion 12b on a counter-shaft 12c which projects at one side of the crank case structure 10 for the mounting of a pulley wheel 12d driven by means of a V-belt or the equivalent from a suitable rotary part of the rolling mill with which the apparatus is associated so that, while the speed at which the apparatus is driven may be in determined relation to the speed of the rolling mill, a certain amount of elasticity in the drive is provided. The large gear wheel 12a keyed to the rotatable sleeve 12 rotates on bearing rings 12e engaging suitably shouldered sleeve members 9f, 9g keyed to the ends of the aforesaid bushing 9a with the rotatable sleeve 12 located therebetween. The bushing 9a has a longitudinally extending channel in its periphery of semi-circular cross-section in which is mounted an oscillatable key 13 which in one position permits free rotation of the gear wheel 12a in relation to the bushing 9a, and in another position engages one of a number of detents 12f in the inner periphery of the rotatable sleeve 12 so as to clutch the gear wheel 12a to the bushing 9a and thereby transmit drive to the crank shaft. The oscillatable key 13 at one end has a radially extending arm 13a adapted to engage a catch member 14a on a lever 14 normally maintained in a predetermined position by a spring 14b holding the lever against a stop 14c which may be adjustable. The oscillatable key 13 also has a projecting part 14d (Fig. 2) frictionally engaging one of the bearing rings 12e of the gear wheel 12a so that the key 13 tends to turn into the engaging position.

The die assemblage A of any suitable kind, but which advantageously may be constructed in accordance with our British Patent No. 588,230, is mounted on the table 3 in a suitable frame 15 which is slidable longitudinally in relation to the table 3 on rollers 3e mounted in recesses in the table 3, this frame 15 being connected by means of rods 15a to a stop D (Figs. 13-16) for co-acting with the end of the profiled section to be cut. The frame 15 connected to the die assemblage extends at the rear end of the table 3 and supports a cross-piece 15b (Fig. 8) having a pair of parallel rods 15c extending therethrough for the mounting of compression springs 15d engaging between the cross-piece and the adjacent end of the table 3 so that, while these springs 15d tend to maintain the die assemblage A normally in a substantially central position on the table 3, they permit of a limited amount of displacement of the die assemblage forwardly in relation to the table. The rearwardly extending part of the die assemblage frame 15 also carries a cam plate 15e which is vertically adjustable to compensate for adjustment in height of the table 3, said cam plate 15e being adapted to engage a roller 16a at one end of a bell crank lever 16 mounted on the crank case structure, such lever having a part 16b engaging the upper end of the catch lever 14. The arrangement is such that when the profiled section from the rolling mill C (Fig. 16) engages the stop D, a limited amount of forward movement of the stop, together with the die assemblage A and frame 15 connected thereto by the said rods 15a, takes place against the action of the springs 15d engaging the rear end of the table, and this movement is sufficient for the cam plate 15e to actuate the bell crank lever 16 for disengaging the catch 14a on the catch lever 14 from the radially projecting arm 13a on the oscillatable key 13, which thereupon moves automatically into engagement with one of the detents 12f on the inner periphery of the rotatable sleeve 12 to which the gear wheel 12a is keyed in order to transmit drive to the slidable frame structure 1. The stop D is arranged, as will be hereinafter described, so that when the length of section is cut, the stop disengages therefrom and the springs 15d engaging the rear end of the table 3 then act to return the die assemblage A to the normal substantially central position. Thus, when the slidable frame structure 15 returns to the initial position on one complete rotation of the crank shaft 9, the cam plate 15e is in position to allow the bell crank lever 16 and consequently the catch lever 14 to return to the initial position for engagement with the radial arm 13a on the oscillatable key 13, whereby the latter is moved to the inoperative position to disconnect the drive to the crank shaft 9.

The slidable frame structure 1 may carry at its rear end a brake-actuating cam plate 1f which, substantially simultaneously with the engagement of the crank drive, acts on a roller 17a carried by a cam lever 17b to release a brake 17 acting on the enlarged bearing sleeve 9f keyed to the aforesaid bushing 9a and, on the slidable frame structure 1 returning to its initial position, permits application of the brake 17 to bring the crank shaft 9 quickly to rest.

During the forward movement of the slidable frame structure 1 by the aforesaid cranks 9, it is first accelerated and then, for a substantial part of its travel, moves at a speed substantially in synchronism with the speed of travel of the profiled section, and then decelerates prior to the return stroke. During the period of substantially synchronous movement the head 5 is reciprocated downwardly and upwardly to operate the dies A to shear the section and then to return the dies to the initial position in which the profiled section can pass therethrough. For the purpose of effecting the reciprocation of the head 5 during the forward stroke of the slidable frame structure 1, pairs of toggle links 18 are provided, the upper end of the pairs being connected by a pin 18c and being journalled in suitable bearings 1k fixed to the underside of the upper part of the slidable frame structure 1, and at the lower end being connected by a pin 18d and pivotally engaging vertically slidable elements 6a in the cross-head structure 6. Each pair of links 18 is pivoted at the junction between the elements thereof on a common transverse spindle 18a which is engaged by parallel arms 18b pivoted to a fixed abutment 19 at the forward end of the bed, the arrangement being such that in the initial position of the slidable frame structure 1 the toggle links 18 are forwardly inclined.

Figure 4:
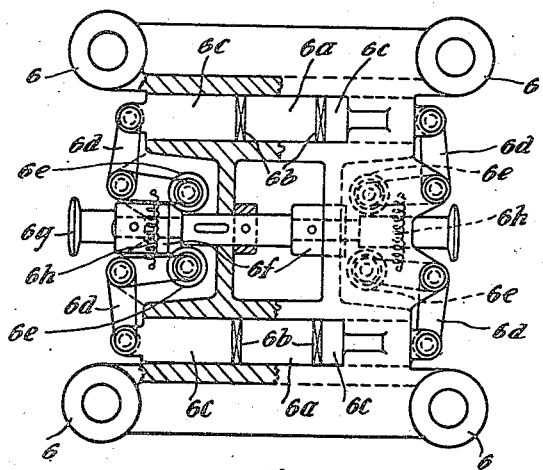
Fig. 4 is a part sectional plan view of the bottom cross-head structure shown in Fig. 1.
Figure 11:
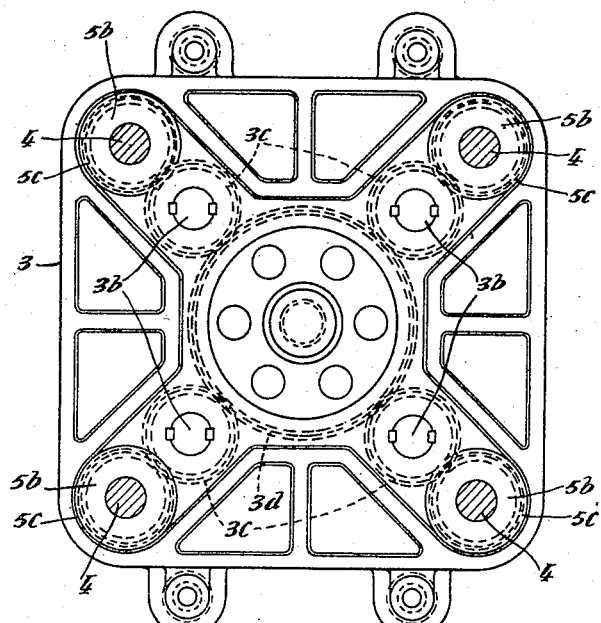
Fig. 11 is a plan view of the adjustable table.
Figure 12:
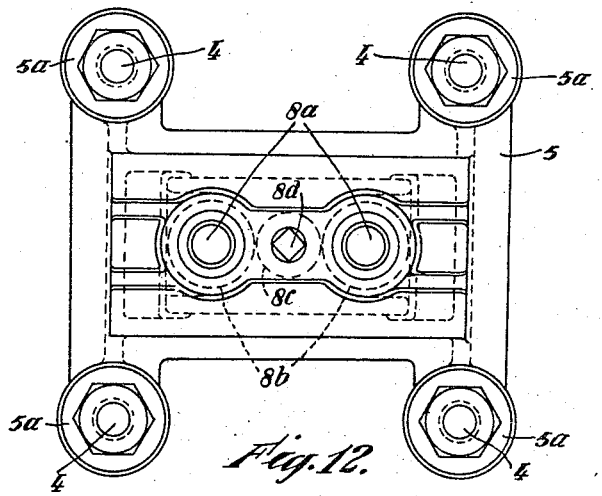
Fig. 12 is a plan view of the die-operating head.

The vertically slidable elements 6a in the cross-head structure 6 are provided in opposite faces with series of transverse teeth or serrations 6b with which correspondingly formed locking members 6c, slidable horizontally in the cross-head structure 6, are adapted to engage so as to lock the vertically slidable elements 6a in relation to the cross-head structure 6 during the forward movement of the slidable frame structure 1, said locking members 6c being operated to disengage from the vertically slidable elements 6a during the return movement of the slidable frame structure 1. For this purpose the slidable locking members 6c may be connected to symmetrically arranged bell crank levers 6d (Fig. 4) provided with rollers 6e adapted to be engaged by enlargements 6f on a slidable control rod 6g, the pairs of levers 6d being connected by springs 6h for maintaining the locking members 6c normally in engagement with the elements 6a. The control rod 6g is mounted in the cross-head structure 6 and adapted to co-act with buffers, one of which, 19a, may be mounted on the aforesaid fixed abutment 19 and the other 2e on a suitable part of the bed adjacent the crank case structure. These buffers 19a, 2e may be spring-mounted and may be adjusted for initially setting the mechanism, the arrangement being such that when the control rod 6g engages the buffer 19a associated with the fixed abutment 19, the bell crank levers 6d are simultaneously operated to withdraw the locking members 6c from engagement with the vertically slidable elements 6a in the cross-head structure 6, it being understood that the locking members 6c are provided with toothed or serrated end faces for engaging the teeth or serrations 6b on the vertically slidable elements 6a. On the return movement of the slidable frame structure 1, the control rod 6g engages the other buffer 2e and is thereby moved to permit re-engagement of the locking members 6c under the action of the springs 6h. In order to take up any slack in the toggle mechanism and thus to maintain the vertically slidable elements 6a in correct relation prior to engagement therewith of the locking members 6c, tension springs 20 (Fig. 3) may be connected between the upper part of the slidable frame structure 1 and a double-armed element 21 journalled on the common spindle 18d connecting the lower ends of the toggle links 18.

The apparatus hereinbefore described operates in the following manner:

When the end of the profiled section engages the stop D and thereby effects the limited forward movement of the die assemblage A and its frame 15 in relation to the table 3, the gear wheel 12a is clutched to the crank shaft 9 in the manner described and the slidable frame structure 1 moves forwardly. During the first half of its forward movement the toggle links 18 are moved into the straight line position and, owing to the engagement of the locking members 6c with the vertically slidable elements 6a in the cross-head structure 6, the latter is forced downwardly, and through its connection by means of the parallel rods 4 with the head 5, effects downward movement of the head which, in turn, acts on the movable die of the die assemblage A to shear the section. During the second half of the forward movement of the slidable frame structure 1, the toggle links 18 move to an opposite position in which they are rearwardly inclined, whereby the cross-head structure 6 and the head 5 are returned to the upper position in which the die again permits the section to pass therethrough. At the end of the forward movement of the slidable frame structure 1 the control rod 6g engages the buffer 19a on the fixed abutment 19, whereby the locking members 6c are withdrawn from engagement with the vertically slidable elements 6a so that during the return movement of the slidable frame structure 1 the toggle links 18 are again moved over into the original position without, however, imparting any reciprocation to the cross-head structure 6. On completion of the return movement, the control rod 6g, by engagement with the other buffer 2e, effects the re-engagement of the locking members 6c with the vertically slidable elements 6a and at the same time the drive to the crank shaft 9 is disengaged and the brake 17 applied in the manner before described.

By disconnecting the connecting rods 11 from the slidable frame structure 1, for which purpose suitable apertures may be provided in the opposite side walls 2a of the bed 2 and disconnecting the fixed abutment 19 from the bed 2, the slidable frame structure 1, together with its toggle mechanism, may be removed from the bed 2 as a unit by sliding longitudinally, while the drive unit, comprising the crank shaft 9 and associated gearing and the crank case unit B carrying the same, likewise may be detached as a unit from the bed 2. The bed 2 conveniently comprises two side frames adapted to be bolted on to a suitable base 22 (Fig. 3) or mounting in spaced relationship.

The stop D for engaging the end of the profiled section comprises an abutment member 23a, constituted by part of a bell crank lever element 23 pivoted transversely in a slidably mounted carriage comprising spaced side plates 24, the arrangement of the lever element 23 being such that when the stop 23a is vertically disposed, the arms of the lever element 23 extend upwardly and forwardly from the pivotal axis thereof at an angle of about 45°. These upwardly extending arms are bored near their ends for the reception of a transverse rod 23b which, at a middle position, pivotally carries the head portion 25a of a spring guide rod 25 extending forwardly and slidable in a transverse member 24a pivotally supported in the said side plates 24. A helical compression spring 25b is arranged on the guide rod 25 and the disposition of the spring 25b is such that it acts as a spring toggle tending to maintain the stop 23a in either of two positions, one vertical and the other horizontal. The carriage 24 slides on rollers 24b engaging guides 26a in side walls 26b of a fixed frame structure 26 having upwardly extending parts 26c provided with cam surfaces 26d engaging rollers 23c on the lever element 23 in such manner that when the dies have been operated to cut the section, further forward movement of the stop carriage 24 causes the lever assemblage 23 to move about its pivot so as to bring the stop abutment 23a forwardly into a horizontal position permitting the profiled section to pass thereover, in which position it is maintained by the action of the compression spring 25b acting thereon in the manner of a spring toggle. On return movement of the stop carriage 24 which is linked to the die assemblage A by means of the rods 15a, the cam surfaces 26d engage the said rollers 23c to elevate the stop 23a to its initial forward position. During this elevating movement a roller 23d, mounted above the stop abutment 23a, engages beneath the cut-off length of the profiled section so as to raise the same and tilt it for discharge in a forward direction. The extent to which the length is tilted is adjustable by means of an adjustably mounted roller 26e disposed forwardly of the stop 23a for engagement above the profiled section. If for any reason the cutting apparatus fails to operate the dies, the compression spring 25b will permit the stop 23a to be forced forwardly into the inoperative position in which it will be maintained by the action of the spring and in which the section can pass freely thereover, the spring being somewhat stronger than the springs 15d associated with the rear end of the table 3. Suitable guide plates 23e and deflectors 23f, are provided for guiding the section into engagement with the stop 23a and for facilitating discharge of the cut length.

The rods 15a connecting the stop carriage 24 with the frame 15 of the die assemblage A may be readily adjustable longitudinally in relation thereto and may have a number of spaced circumferential recesses 15f therein, whereby the stop carriage 24 may be readily positioned thereon, at any one of a number of predetermined points for cutting off various lengths as may be required, by means of clamping brackets 24c adapted to engage the recesses 15f.

In order that the cut lengths may be discharged forwardly and downwardly by the action of the stop, the rods 15a are suitably spaced apart (Figs. 14 and 16) and the fixed frame structure 26 in which the stop carriage 24 slides projects laterally from a supporting bed 27 therefor. The bed 27 is of substantial length and the frame structure 26 is adapted to be slidably adjustable thereon and to be clamped in any desired position according to the adjustment of the stop carriage 24 on the rods 15a. The supporting bed 27 may comprise a framework carried on pedestals 27a and for the purpose of enabling the height of the supporting bed to be readily adjusted, the pedestals comprise telescopically movable elements adapted to be simultaneously adjusted by suitable gearing means 27b arranged on shafts 27c extending longitudinally of the bed 27 and coupled together by chain 27d and sprockets or equivalent means whereby all the pedestals may be simultaneously adjusted from a single control point.

It will be understood that the invention is not limited to the particular embodiment hereinbefore described. For example, the means for clutching and declutching the toggle or equivalent mechanism may be provided in association with the upper part of the slidable frame structure instead of with the cross-head. Furthermore, any other suitable means may be provided for effecting intermittent reciprocation of the slidable frame structure. Such means may comprise equivalent mechanical means or may comprise hydraulic, compressed air or equivalent operating means having a resilient action, whereby the necessary synchronism of movement during the cutting operation may result automatically from the engagement of the dies with the section and the consequent locking action thereof on the section. Furthermore, it will be understood that by utilising suitable dies, the apparatus described may be employed for punching, embossing or pressing continuously moving material, in which case the periodical clutching of the drive would be effected by any suitable means serving to space the positions along the length of the material at which the dies are caused to operate.

I claim:

1. Apparatus for cutting, punching or pressing continuously moving strip material comprising a supporting bed, a carrier reciprocable on said bed in the direction of movement of the strip material, a die assemblage mounted on said carrier, power operated means for intermittently reciprocating said carrier, length-determining means including a member actuated by the moving strip material for periodically coupling said power operated means to advance and return said carrier through a cycle of reciprocation in synchronism with the speed of travel of the material, die operating means including a toggle mechanism connected between said carrier and vertically reciprocating die operating means and to a fixed abutment whereby during forward movement of the carrier by the power operated means the toggle mechanism operates to effect a complete downward and upward reciprocation of the die operating means, and means for automatically disconnecting the toggle mechanism from the die operating means during return movement of the carrier whereby the toggle mechanism is returned to its initial position without actuating the dies.

2. Apparatus according to claim 1, wherein means are provided for clutching the toggle mechanism to the die-operating means during the forward stroke of the carrier and for declutching the same during the return stroke of the carrier.

3. Apparatus according to claim 1, wherein the toggle linkage is connected at the upper end to the reciprocable carrier and at the lower end to a cross-head structure vertically slidable in relation to the carrier and connected by parallel rods to a die-operating head disposed above the carrier.

4. Apparatus according to claim 3, wherein the toggle linkage at the lower end is connected to elements slidable in relation to the cross-head structure and adapted to be clutched thereto by means of toothed elements, the movement of the clutch elements for engaging and disengaging from the slidable elements being effected by mechanism co-operating with buffer stops at the ends of the reciprocatory movement of the carrier.

5. Apparatus according to claim 1, wherein the die assemblage is displaceable to a limited extent in relation to the carrier in the direction of movement of the material, by connection to means co-acting with the material for determining the position at which the dies operate, so that said position is independent of precise timing of the carrier movement.

6. Apparatus according to claim 5, wherein means, connected to the die assemblage, is adapted to actuate clutch mechanism for effecting the intermittent reciprocation of the carrier.

7. Apparatus according to claim 6, wherein the relative displacement of the die assemblage in relation to the carrier is controlled by springs serving to return the assemblage to the initial position after the operation of the dies whereby, on completion of the return stroke of the carrier, the drive clutch means may be disengaged.

8. Apparatus according to claim 1, wherein the said carrier is supported and guided on rollers for slidable movement upon the bed.

9. Apparatus according to claim 1, wherein the apparatus is constructed in such manner that the carrier and its toggle mechanism may be readily removed as a unit from the bed on which it slides and so that the mechanism for effecting reciprocation of the carrier also may be removed as a unit.

10. Apparatus according to claim 1, wherein the die assemblage is supported on the carrier by means of a table the height of which is adjustable in relation to the carrier, and wherein means also are provided for adjusting the height of the die-operating head above the table.

11. Apparatus according to claim 1 wherein the toggle linkage is connected at the upper end thereof to the reciprocable carrier and at the lower end thereof to a cross-head structure vertically slidable in relation to the carrier and connected by parallel rods to a die-operating head disposed above the carrier and wherein the rods connecting the die operating head with the cross-head structure co-operating with the toggle mechanism engage screw-threaded means in the die operating head adjustable in length by rotary movement, and said means are geared together so as to operate in unison.

12. Apparatus according to claim 11, wherein the said means also are geared to similar adjusting means associated with the table whereby the head and the table may be raised and lowered simultaneously.

13. Apparatus according to claim 12, wherein a die-operating element mounted in the head is adjustable in relation thereto by means of parallel adjusting spindles geared together for operation in unison.

14. Apparatus according to claim 1 for cutting off predetermined lengths from continuous length material, such as a profiled section delivered from a rolling mill, wherein the length-determining means comprises a stop element carried by a lever structure influenced by a spring and having a toggle action, said length-determining means being connected to and being reciprocable with the die assemblage, and cam surfaces being provided whereby, on operation of the dies to cut the section, the stop is caused to move forwardly about a pivotal axis so as to disengage from the end of the profiled section, whereafter the toggle spring acts to complete movement of the stop into a substantially horizontal position in which the cut-off length can pass freely thereover.

15. Apparatus according to claim 14, wherein said cam surfaces are adapted to effect return of the length-determining means to its initial position during the return movement of the die assemblage.

16. Apparatus according to claim 15, wherein the stop element of the length-determining means is fitted with a roller spaced above the same so that in the return movement of the stop the roller engages beneath the cut length and by co-operation with a roller disposed above the section at the forward end of the stop assemblage, serves to tilt the section and thereby facilitate or effect its forward discharge without any manual manipulation.

17. Apparatus according to claim 16, wherein the toggle spring furthermore is adapted to act as a safety release for the section in the event of any failure of the die-operating means.

18. Apparatus according to claim 1, wherein the connection of the length-determining or spacing means with the die assemblage is effected by means of rods having circumferential recesses at definitely spaced positions thereon whereby the member actuated by the moving strip may be positioned for operation of the dies at any one of a number of predetermined lengths or spacings.

EMIL PENKALA.

REFERENCES CITED

The following references are of record in the file of this patent:

UNITED STATES PATENTS

| Number | Name | Date |
| --- | --- | --- |
| 2,133,542 | Jensen | Oct. 18, 1938 |